Dec. 15, 1936.   H. A. MANTZ   2,064,436
ELECTRIC SAFETY PILOT
Filed Oct. 1, 1934
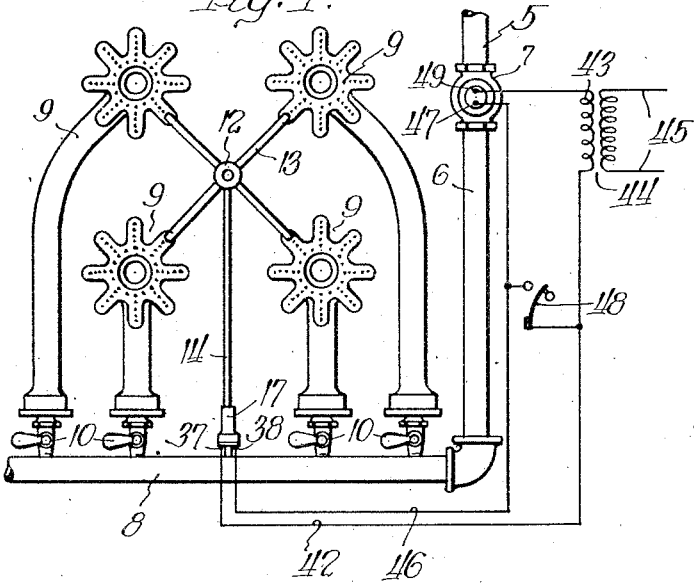
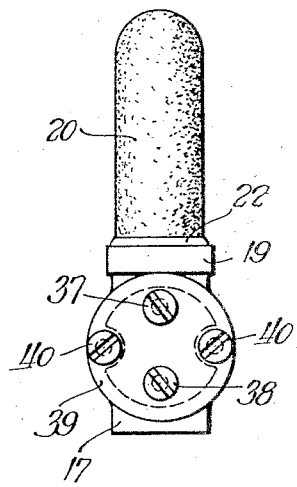
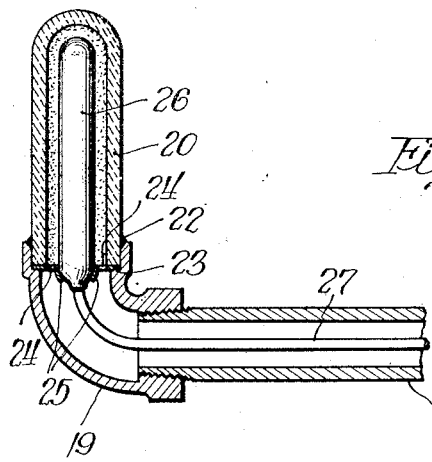
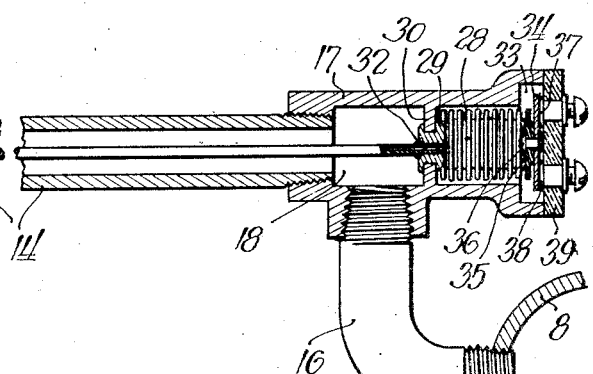
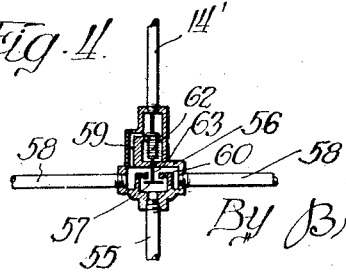
Inventor:
Harold A. Mantz.
By Brown, Jackson, Boettcher & Dienner
Attys.

Patented Dec. 15, 1936

2,064,436

UNITED STATES PATENT OFFICE 2,064,436

ELECTRIC SAFETY PILOT

Harold A. Mantz, Milwaukee, Wis., assignor to Milwaukee Gas Specialty Company, Milwaukee, Wis., a corporation of Wisconsin Application October 1, 1934, Serial No. 746,391

3 Claims. (Cl. 158—117.1)

This invention relates to safety pilots, and is more particularly directed to safety pilots for use in domestic gas ranges, hot water heaters, gas burners and the like.

In a preferred embodiment of the present invention, I provide a novel type of pilot construction comprising a hollow ceramic tip of porous character, mounted directly upon a lighter tube carried by the gas supply manifold, and having a thermally responsive pressure controlling member disposed within the tip and responsive to the heat thereof for controlling a safety fuel supply valve disposed in the gas manifold. The particular construction shown in the present invention may be employed for either mechanical or electrical control of the safety valve.

The present invention has for its primary object the provision of a safety pilot which is incapable of becoming clogged by deposits of residues or gums from the gaseous fuel, and which is extremely resistant to drafts or the like, whereby the heat of the pilot may be employed to secure positive control of a diaphragm or solenoid type of valve, or may be employed for transmission of mechanical motion to a mechanical type of valve.

A further object of the present invention is to provide a thermally responsive element which is enclosed within the pilot tip itself, and is therefore subjected only to the heat of the pilot flame, being insulated and protected by the tip from the influences of outside temperatures.

A still further object of the present invention is to provide a thermally actuated mechanism enclosed within the pilot tip and the lighter tube leading from the fuel supply line, and which is capable of controlling a remotely disposed valve.

Another object of the present invention is the provision of a thermally responsive member in the pilot tip which is capable of translating the temperature sensings of the mechanism to mechanical motion at a point removed from the tip without any moving structural elements therebetween.

A distinct advantage provided by the present invention is the provision of a simplified self-contained safety pilot of compact design, having no intricate operating parts, and which is economical in cost and reliable in operation.

Other objects and advantages of the present invention will appear more fully from the following detailed description which, taken in connection with the accompanying drawing, will disclose to those skilled in the art the particular construction and operation of a preferred form of my invention.

In the drawing:

Figure 1 is a diagrammatic plan view of a domestic type of gas range provided with the safety pilot of the present invention;

Figure 2 is a vertical sectional view taken through the safety pilot shown in Figure 1, illustrating in detail the construction thereof;

Figure 3 is an end elevational view of the safety pilot shown in Figure 2; and

Figure 4 is a detail diagrammatic view of a modified form of the invention.

Referring now in detail to the drawing, a fuel supply line is indicated generally at 5, and communicates with the fuel conduit 6 through the solenoid valve, or a diaphragm type of valve indicated diagrammatically at 7.

The conduit 6 is adapted to conduct fuel from the supply line 5 to a gas manifold 8, which manifold is adapted to supply a plurality of burners 9 connected thereto through the valve 10.

A pilot hood is indicated generally at 12, and is provided with radially extending flash tubes 13 leading to the adjacent portions of the burners 9, whereby when fuel is supplied to one of the burners 9 the fuel issuing from the ports covered by the tubes 13 will be conducted to the pilot flame within the hood 12, ignited by this flame, and flashed back to the burner to ignite the same. The pilot flame within the hood 12 is adapted to receive its fuel supply through the lighter tube 14, connected to the manifold 8.

Referring now to Figure 2, the supply manifold 8 is connected, through the L connection 16, to a body member 17 having the chamber 18 therein receiving fuel from the manifold 8 through the connection 16. The lighter tube 14 is threaded into and communicates with the chamber 18 at one end, and at the opposite end is threaded into the elbow 19, which elbow is turned upwardly, and is recessed at its opposite end to receive the porous hollow ceramic tip 20.

This tip 20 is in the form of a cylindrical member having a rounded closed end, and being open at its opposite end, which communicates with the interior of the elbow 19. Suitable cementing means 22 is disposed around the outer surface of the tip 20 adjacent the end of the elbow 19 for securing the tip in position with respect thereto. Interposed between the lower peripheral edge of the tip 20 and the shoulder formed in the elbow 19 is an annular supporting member 23, having downturned tongues formed therein providing port means 24 extending therethrough, the down-turned tongues 25 serving to support a pressure bulb member 26 in upright position within the tip 20.

The pressure bulb 26 is a sealed pressure chamber containing a fluid capable of expanding and contracting in accordance with increases and decreases in the temperature surrounding the same. This chamber 26 is connected, through the capillary tube 27, to an expandible bellows member 28, of the type commonly known as a sylphon bellows, the tube 27 extending through a sealing bushing 29 carried by the partition wall 30 forming one wall of the chamber 18. The bushing serves to seal the opening through which the tube 27 passes against leakage of gas therethrough, and the tube 27 is, in turn, sealed to the bushing 29, as indicated at 32.

The bellows 28 is disposed within a second chamber 33 formed in the body or housing member 17, and at its end is adapted to carry a bridging contact member 34, which is supported upon an insulating member 35 by means of the rivets 36. This bridging contact member 34 is adapted to engage across the contact terminals 37 and 38, carried upon an insulating closure member 39 secured to the open end of the chamber 33 by means of the screws 40.

The contact terminals 37 and 38 are provided with threaded screws for securing terminal lugs for conductors thereto.

Referring now again to Figure 1, the conductor 42 leads from the secondary 43 of a transformer 44, connected by the conductors 45 to a suitable source of electrical supply, to one terminal 37 of the switch controlled by the bellows 28. The opposite terminal 38 is connected through conductor 46 to one terminal of the solenoid valve 7, the terminal being indicated at 47. Preferably, a normally open manually controlled switch 48 is interposed in the line to provide for manual closing of the circuit to the solenoid valve 7, if desired, shunting out the switch controlled by the pilot flame.

The opposite side of the secondary 43 of the transformer 44 is connected to the terminal 49 of the solenoid valve 7, and thus a circuit is completed extending from the secondary 43 of the transformer through the conductor 42, the switch contact terminals 37 and 38 and conductor 46 to the solenoid valve 7, and from the solenoid valve 7 back to the secondary of the transformer. It is therefore apparent that by moving the bridging member 34 away from the contact terminals, this circuit is broken and the valve 7 will be closed.

During normal operation of the pilot lighter, the flame is maintained about the outer surface of the tip member 20 by reason of its porous construction, and the heat of this flame is transmitted into the interior of the tip, thereby directly affecting the pressure bulb 26. The increase in temperature about the surface of this bulb results in expansion of the fluid therein, and this expansion of the fluid is transmitted through the capillary tube 27 to the bellows 28, moving the bridging member 34 into contact across terminals 37 and 38 to close a circuit for maintaining the valve member 7 open.

While the pilot burner is being ignited, that is, while the temperature of the pressure bulb 26 is still relatively cool, the manually operable switch 48 may be closed for opening the valve 7 in order to provide a proper fuel supply to the pilot burner. Upon release of the switch 48, the switch moves to its open position, and thereafter the operation of the valve 7 is controlled solely by means of bellows 28 which, in turn, is moved in accordance with the temperature sensings of the pressure responsive member 26.

The particular tip provided is capable of offering strong resistance to drafts, since the flame burns about the entire surface of the tip and therefore will tenaciously cling to the leeward side of the tip when a draft is blowing over the same. This particular type of tip will maintain a flame with a wind pressure of ten miles per hour. Further, the tip, because of its ceramic composition, is capable of producing a relatively high temperature within the interior thereof, which is desirable for effecting positive control of the bellows 28 through the pressure responsive member 26. At the same time, this high temperature within the tip prevents the depositing of any gums or residues from the gas within this chamber, and thereby prevents clogging of the pilot burner by such residues, as no metering valve is required in a pilot burner using this type of ceramic tip.

It will be noted that the entire control mechanism for the switch is disposed within the pilot tip and the lighter tube, with none of the parts being exposed to the influence of outside temperatures, or subjected to external mechanical injuries. Thus a compact and simplified design is provided, and no moving parts need be provided between the pilot burner or tip 20 and the switch mechanism, inasmuch as the fluid pressure is transmitted therebetween to produce a translation of the heat at the pilot tip into movement at a remotely disposed point. It is thus apparent that a remotely disposed valve, such as the valve 7 in the fuel supply line, can be controlled by the pilot tip and switch structure shown.

In Figure 4, I have provided a similar construction, in which the incoming fuel supply manifold is indicated at 55, leading into a valve body 56 having the valve 57 therein, with a range manifold 58 or the like extending outwardly from opposite sides of the valve body 56. The range manifolds 58 provide a fuel supply to the burners 9 and correspond to the manifold 8. The fuel supply line 55 corresponds to the line 5 of Figure 1.

The pilot lighter tube, indicated at 14', is fed from a passageway 59 drilled in the valve body 56 and communicating with the outlet chamber 60 of the valve body so that fuel supply to the outlet chamber will pass through the passageway 59 and to the pilot tip.

An expansible bellows 62, corresponding to the bellows 28 of Figure 2, is mechanically connected to the valve stem 63, whereby upon expansion or contraction of the bellows 62 in response to changing temperature conditions at the pilot tip, the valve stem 63 is reciprocated to open or close the valve member 57, thus controlling the flow of fuel from the fuel supply line 55 to the manifold 58.

It will be noted, in this modification, that the temperature sensed within the pilot tip 20 will be translated into mechanical motion of the valve stem 63 by means of the pressure connection through the bellows 62, whereas in the previous embodiment an electrical contact was made or broken in order to control the operation of a remotely disposed valve.

It is to be understood that any desired type of switch arrangement may be provided in place of the bridging contact 34 and contact terminals 31 and 35 in order to control one or a plurality of circuits.

Some of the lower grades of gaseous fuel now provided contain a relatively large percentage of what is termed "vapor-phase" gum or residues, which deposit upon any cooled surfaces forming a restriction to the flow of fuel. By the provision of the novel type of pilot tip, together with the lighter tube arrangement which I have disclosed, there is no restriction placed in the path of the flow of fuel from the manifold 8 to the pilot tip, except the port holes 24 through the supporting spider 23. However, the temperature adjacent this zone is maintained relatively high, due to the character of the tip, its extent down into position adjacent the spider, and the flame burning thereon, and consequently there will be no residues or gum deposited about this surface. This is distinctly advantageous, in that there is no danger of the gas passageway becoming clogged or otherwise failing to function positively, and at the same time, there is no necessity for frequent cleaning or inspection service.

Having described my invention in accordance with the patent statutes, I do not intend to be limited to the specific embodiments which have been illustrated in connection with the description of the invention, but only insofar as defined by the scope and spirit of the appended claims.

I claim:

1. In a pilot burner construction, a lighted tube, a housing at one end of said tube connected to a fuel supply manifold, a terminal plate carried by said housing, switch contacts therein, a closed chamber in said housing having a bellows secured to one wall thereof, contact bridging means carried by said bellows and positioned to engage said contacts upon movement of said bellows, an elbow at the opposite end of said tube, a cup-shaped hollow porous pilot tip supported on said elbow and receiving fuel from said manifold, a spider interposed between the open end of said tip and said elbow, a fluid filled thermostatic bulb supported on said spider and extending into said tip, and means providing communication between the interior of said bellows and said bulb and disposed within said lighter tube whereby expansion of the fluid within said bulb in response to temperatures at said pilot tip will produce mechanical movement of said bellows.

2. In a pilot burner construction, a lighter tube, a housing at one end of said tube provided with means for connection to a source of gas, a terminal plate closing said housing and having switch contacts disposed within said housing, a wall in said housing forming with said terminal plate a closed chamber therein, a bellows in said chamber, contact bridging means carried by said bellows and positioned to engage said contacts upon movement of said bellows, a cup-shaped pilot tip at the opposite end of said tube communicating with the interior thereof, a fluid-filled thermostatic bulb within said tip, and means disposed entirely within said lighter tube and providing communication between said bulb and said bellows whereby expansion of the fluid within said bulb in response to temperatures at said tip will produce mechanical movement of said bellows.

3. A safety pilot including a lighter tube, an elbow at one end of said tube having a vertically directed opening, a cup-shaped pilot tip having its open end secured in said opening, a housing at the opposite end of said tube adapted for connection to a fuel supply manifold, a supporting spider engaged between the open end of said tip and said elbow, thermally responsive pressure-developing means supported by said spider entirely within said tip, contacts carried by said housing, a pressure-responsive bellows means in said housing connected through said tube to said pressure-developing means, and a contact bridging member carried by said pressure responsible means and movable thereby upon increases in pressure at said pressure-developing means for engaging said contact.

HAROLD A. MANTZ.